(12) United States Patent
Fukuda et al.

(10) Patent No.: US 7,473,483 B2
(45) Date of Patent: Jan. 6, 2009

(54) DIRECT METHANOL FUEL CELL

(75) Inventors: Shinsuke Fukuda, Osaka (JP);
Hideyuki Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 145 days.

(21) Appl. No.: 11/377,450

(22) Filed: Mar. 17, 2006

(65) Prior Publication Data

US 2006/0210863 A1 Sep. 21, 2006

(30) Foreign Application Priority Data

Mar. 18, 2005 (JP) ............................. 2005-078883

(51) Int. Cl.
*H01M 2/00* (2006.01)
*H01M 2/14* (2006.01)
(52) U.S. Cl. ............................. 429/34; 429/38; 429/39
(58) Field of Classification Search .................. 429/38, 429/30, 39
See application file for complete search history.

(56) References Cited

U.S. PATENT DOCUMENTS 6,613,464 B1 * 9/2003 Wilkinson et al. ............ 429/13
6,824,900 B2 * 11/2004 DeFilippis .................... 429/13
6,908,500 B2 * 6/2005 Fisher et al. ..................... 96/6
2003/0190504 A1 * 10/2003 Fisher et al. .................. 429/17
2005/0008921 A1 * 1/2005 Johnson ....................... 429/34
2006/0008693 A1 * 1/2006 Kamo et al. .................. 429/34

FOREIGN PATENT DOCUMENTS

JP 2002-175817 6/2002

* cited by examiner

*Primary Examiner*—Dah-Wei D Yuan
*Assistant Examiner*—Adam A Arciero
(74) *Attorney, Agent, or Firm*—McDermott Will & Emery LLP

(57) ABSTRACT

For give a direct methanol fuel cell which secures the fuel supply to the catalyst layer, reliably discharge generated carbon dioxide gas, and has excellent electricity generation ability, at least a portion of the anode side flow path is divided by a film having water-repellency and gas permeability to a first flow path portion positioned at the membrane electrode assembly side and a second flow path portion positioned at the bottom side of the anode side flow path where a fuel mainly flows in the first flow path portion and carbon dioxide mainly flows in the second flow path portion.

6 Claims, 4 Drawing Sheets

F I G. 4
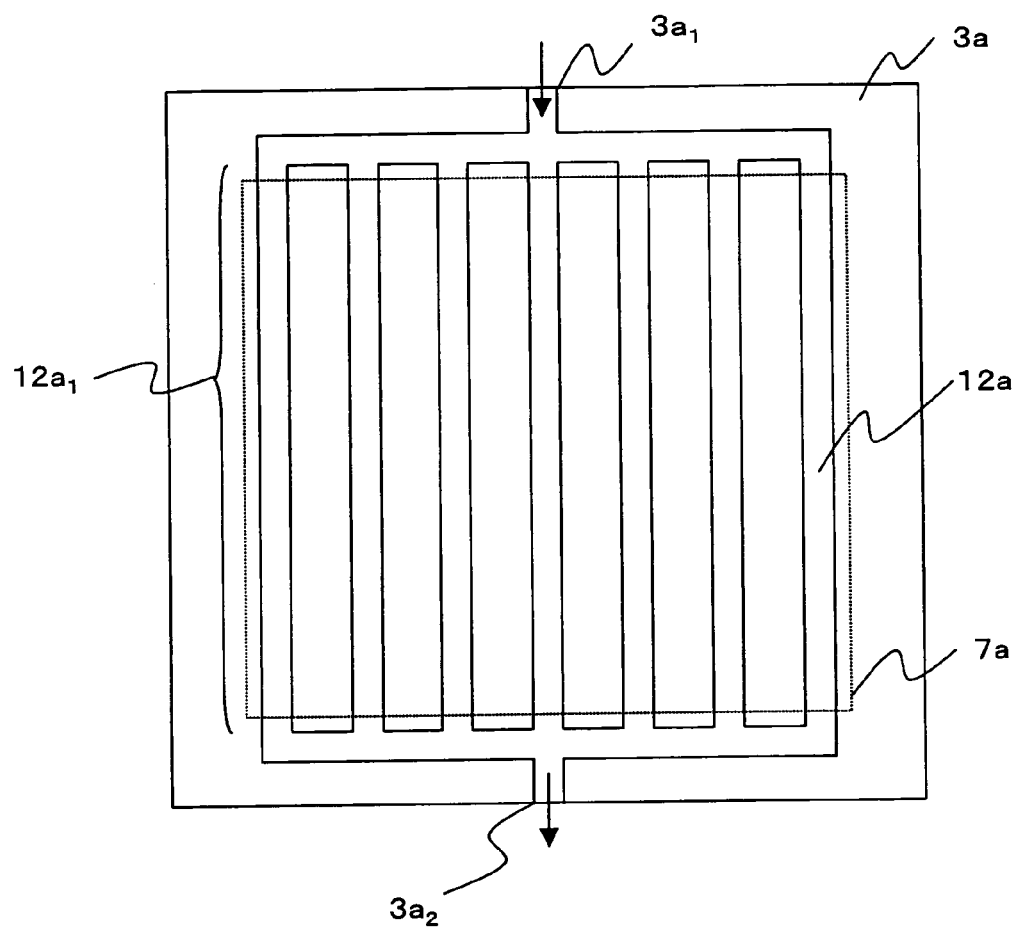

DIRECT METHANOL FUEL CELL

FIELD OF THE INVENTION

The present invention relates to solid polymer electrolyte fuel cells, especially to a flow path of a separator in a direct methanol fuel cell.

BACKGROUND OF THE INVENTION

With mobile electronic devices such as mobile phones, personal data assistants (PDA), laptop computers, and camcorders becoming more multi-functional, power consumption and usage time for these devices increased. To provide for these increases, high energy density is strongly desired for the batteries to be mounted on these devices. Currently, lithium secondary batteries are mainly used for those devices. However, the energy density of lithium secondary batteries are predicted to reach its limit at about 600 Wh/L in around the year 2006, and for replacement, polymer electrolyte fuel cells (PEFC) are expected to be in practical use earlier.

Among fuel cells, a direct methanol fuel cell (also simply referred to as DMFC hereinafter), is gaining attention and researches and developments are actively conducted for DMFC. In DMFC, a fuel, namely methanol or an aqueous methanol solution, is supplied to the inside of the cell without reforming the fuel to hydrogen, and oxidized at an electrode for acquiring electricity. Reasons for DMFC to gain attention may be the following, just to name a few: an organic fuel has a high theoretical energy density and is easy to store, and further, a direct methanol fuel cell system can be easily simplified.

A cell of a DMFC is structured to have the following: a membrane electrode assembly (MEA) obtained by sandwiching a polymer electrolyte membrane with an anode (fuel electrode) and a cathode (air electrode) each having a catalyst layer and a diffusion layer; and a pair of separators sandwiching both sides of the MEA. A fuel, namely methanol or an aqueous methanol solution, is supplied to an anode, and an air is supplied to a cathode to obtain electricity.

An electrode reaction in a DMFC is illustrated in the following:

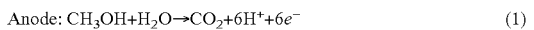

Anode: $CH_3OH + H_2O \rightarrow CO_2 + 6H^+ + 6e^-$ (1)

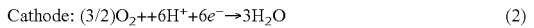

Cathode: $(3/2)O_2 + +6H^+ + 6e^- \rightarrow 3H_2O$ (2)

The formulae (1) and (2) above show that in the anode, methanol and water are reacted to produce carbon dioxide, protons, and electrons; the protons reach the cathode via the polymer electrolyte membrane; and in the cathode, oxygen, the protons, and the electrons passed through the external circuit, are bonded to produce water.

However, there are some problems in practical usage of DMFC. One of the problems is related to discharge of the reaction product, i.e., the carbon dioxide gas. Carbon dioxide generated in the anode passes through the anode-side diffusion layer, reaches into the flow path of the separator, and finally is discharged to the outside via the flow path. At this time, the generated carbon dioxide partially remains in the diffusion layer to inhibit the fuel to diffuse into the catalyst layer, and gradually accumulates to create large bubbles. Then, the bubbles push the fuel out from the micropores of the diffusion layer, thereby causing the fuel supply for the catalyst layer to be insufficient, and a portion of unused fuel to be discharged to the outside. As a result, the electricity production might drop greatly at a high current density side.

As a method to solve such problems, there has been proposed to provide a liquid fuel flow path and an exhaust flow path independently (i.e., completely separated), as well as a diffusion layer which has liquid permeability but hardly permeates gas to face the liquid fuel flow path, and a diffusion layer having gas permeability to face the exhaust flow path in the anode side separator (i.e., Japanese Laid-Open Patent Publication No. 2002-175817).

However, the above conventional technique is yet to be improved, in terms of providing a direct methanol fuel cell having sufficient electricity production ability without reducing fuel usage efficiency.

According to the above technique, the problem in carbon dioxide gas discharge is possibly solved. However, since the completely separated fuel flow path and exhaust flow path are provided at the anode side separator, when the diffusion layer is low in fuel permeability, the fuel amount to be supplied to the region in the surface of the catalyst layer facing the exhaust flow path becomes insufficient, causing a decrease in the output.

Thus, to solve such conventional problems as mentioned in the above, the present invention aims to provide a direct methanol fuel cell with excellent electricity production ability in which the amount of the fuel supply for the catalyst layer is secured, and the produced carbon dioxide gas is further reliably discharged.

BRIEF SUMMARY OF THE INVENTION

To solve the above problems, in the present invention, a direct methanol fuel cell comprises:

a membrane electrode assembly with a first side and a second side opposite to the first side, the assembly comprising a polymer electrolyte membrane with a first side and a second side opposite to the first side, an anode attached to the first side of the polymer electrolyte membrane, and a cathode attached to the second side of the polymer electrolyte membrane;

an anode side separator disposed on the first side of the membrane electrode assembly; and a cathode side separator disposed on the second side of the membrane electrode assembly;

wherein the anode side separator is provided with an anode side flow path on an anode side thereof, and the cathode side separator is provided with a cathode side flow path on a cathode side thereof, at least a portion of the anode side flow path is divided, along the direction perpendicular to the depth thereof by a film permeable to gas but hardly permeable to liquid, to have a first flow path portion positioned at a side of the membrane electrode assembly and a second flow path portion positioned at a bottom side of the anode side flow path, and a fuel mainly flows in the first flow path portion and carbon dioxide mainly flows in the second flow path portion.

Such structure prevents carbon dioxide gas generated by electricity production to stay particularly in the anode side flow path and in the anode side diffusion layer, and especially enables to prevent a blockage of fuel supply to the anode side catalyst layer. Additionally, by dividing the anode side flow path along the direction perpendicular to the depth thereof, and by making the fuel to flow mainly in the divided portion of the flow path contacting the membrane electrode assembly, the fuel can be supplied to the anode side diffusion layer from the whole opening of the anode side flow path, and the fuel can be supplied evenly to the whole surface of the anode side catalyst layer.

Such film for the division is preferably formed of a porous body formed of at least one material selected from the group consisting of carbon, ceramic, glass, and resin, in view of further reliably minimizing deterioration of battery performance from corrosion by the fuel and from the reaction with the catalyst layer. The above film may be formed of a composite material including two or more kinds of these materials.

A water-repellency treatment is preferably given on the membrane electrode assembly side of the film, and the membrane electrode assembly side of the film preferably has uneven surface.

The porous body forming the film has micropores with gas permeability. The porous body may be a film, a sheet, or a mesh. By especially giving a water-repellency treatment to the porous body surface to form a water-repellent layer, the water-repellency ability and the liquid-repellency ability can be controlled by adjusting the thickness of and the surface form (unevenness) of the water-repellent layer. This enables the film to permeate gas while blocking a liquid fuel, and enables the control of the ratio between the speed of liquid fuel permeation and the speed of gas permeation.

That is, the film having gas permeability but hardly permeates liquid is preferably formed of a water-repellent layer and a gas permeable layer. When these layers are provided, the water-repellent layer hardly permeates liquid, and the gas permeable layer is formed of a porous body and has gas permeability.

The second flow path portion in which carbon dioxide mainly flows is preferably structured so that a cross sectional area thereof substantially perpendicular to the longitudinal direction of the second flow path portion increases from an upstream side to a downstream side.

Carbon dioxide generated in the anode (especially in the anode side catalyst layer) reaches the anode side flow path of the anode side separator via the anode side diffusion layer. Then, since carbon dioxide is discharged to the outside via the anode side flow path, in the anode side flow path, occupancy rate for carbon dioxide gas becomes higher at a downstream side than at an upstream side in the fuel flow direction. Therefore, in the second flow path portion in which carbon dioxide mainly flows, carbon dioxide can be discharged further smoothly when the cross sectional area substantially perpendicular to the longitudinal direction of the second flow path portion is structured to increase from an upstream side to a downstream side.

In the first flow path portion in which fuel mainly flows, the cross sectional area substantially perpendicular to the longitudinal direction of the first flow path portion is preferably structured to decrease from an upstream side to a downstream side.

Since the amount of fuel decreases as the fuel is utilized for electricity generation, the first flow path portion in which fuel mainly flows may be structured so that the cross sectional area of the first flow path portion substantially perpendicular to the longitudinal direction thereof is decreased from an upstream side to a downstream side. Such structure enables effective space usage.

In the fuel cell as described in the above, the film permeable to gas but hardly permeates liquid has to be fixed to any of the side walls forming the anode flow path by bonding, welding, press-bonding, or the like. In such structure, the volume of the flow path in which carbon dioxide gas flows and the volume of the fuel flow path are determined by the film permeable to gas but hardly permeates liquid. This flow path volume ratio (carbon dioxide gas flow path to fuel flow path) is an important factor which determines the carbon dioxide discharge amount and the fuel supply amount. Therefore, the film which selectively passes carbon dioxide gas has to be fixed on any of the walls forming the anode flow path so that the flow path volume ratio does not change.

According to the present invention as described in the above, in addition to securing the fuel amount to be supplied to the anode side catalyst layer particularly, generated carbon dioxide gas can be further securely discharged, enabling to realize a direct methanol fuel cell with excellent electricity production ability.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

FIG. 4 is a front view of the anode side separator 3a used in Example 1 seen from the anode side flow path side.

DETAILED DESCRIPTION OF THE INVENTION

Figure 1:
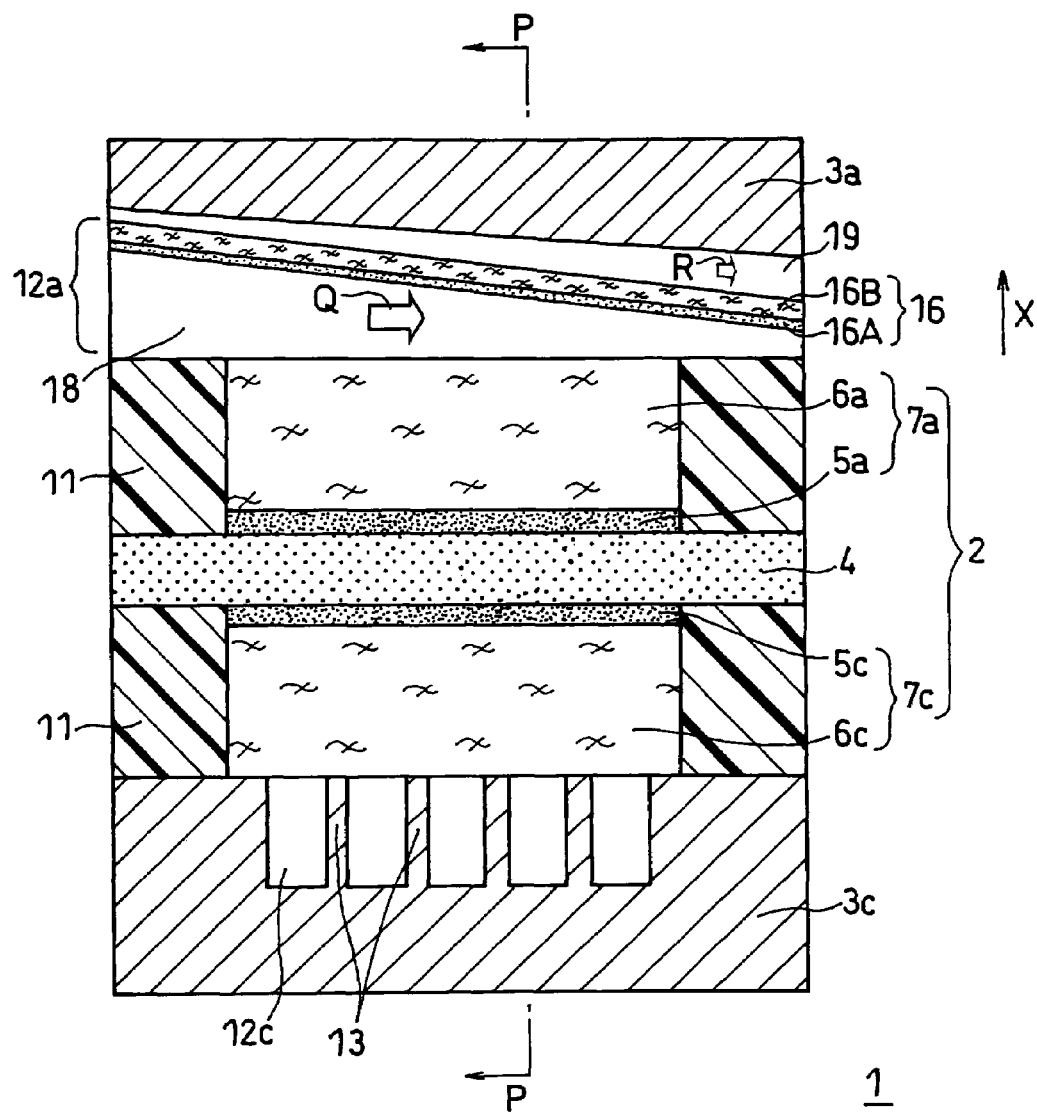
FIG. 1 is a schematic cross sectional view illustrating an example and an embodiment of a structure of a direct methanol fuel cell 1 (unit cell) of the present invention.

In the following, preferable embodiments of the present invention are described by referring to the drawings. In the figures, the same reference numerals designate the same or corresponding parts throughout the different views, and redundant explanations may be omitted.

FIG. 1 is a schematic cross sectional view illustrating a preferable embodiment of a direct methanol fuel cell 1 (unit cell) of the present invention. In the direct methanol fuel cell 1 in FIG. 1, a single unit cell (unit cell 1) is included. However, in the direct methanol fuel cell 1 of the present invention, a plurality of unit cells may be stacked for the usage.

The direct methanol fuel cell 1 comprises a membrane electrode assembly 2, and an anode side separator 3a and a cathode side separator 3c sandwiching the membrane electrode assembly 2.

The membrane electrode assembly 2 comprises a polymer electrolyte membrane 4 with hydrogen ion (cation) conductivity, and an anode 7a and a cathode 7c sandwiching the polymer electrolyte membrane 4. The polymer electrolyte membrane 4 has a first side, and a second side opposite to the first side. The anode 7a includes an anode side diffusion layer 6a and an anode side catalyst layer 5a, and is attached to the first side of the polymer electrolyte membrane 4. On the other hand, the cathode 7c includes a cathode side diffusion layer 6c and a cathode side catalyst layer 5c, and is attached to the second side of the polymer electrolyte membrane 4.

As shown in FIG. 1, a unit cell 1 is formed mainly of a membrane electrode assembly 2, mentioned later, a gasket 11, and a pair of separator plates 3a and 3c. The gaskets 11 are disposed around the anode 7a and the cathode 7c while sandwiching and an edge portion of the polymer electrolyte membrane 4, to prevent the fuel supply to the membrane electrode assembly 2 from leaking outside, to prevent air from leaking outside, and to prevent air from being mixed with fuel.

Each component of the direct methanol fuel cell 1 of the present invention is described first.

For the polymer electrolyte membrane 4, various polymer electrolyte membranes may be used without limitation, as long as the membrane is excellent in hydrogen ion conductivity, thermal resistance, and chemical stability.

The anode side catalyst layer 5a and the cathode side catalyst layer 5c are in the form of a thin film. The anode side catalyst layer 5a and the cathode side catalyst layer 5c are mainly formed of catalyst particles obtained by allowing conductive particles (conductive carbon particles, for example) to carry a metal catalyst, or formed of metal catalyst particles and a polymer electrolyte having cation (hydrogen ion) conductivity, for example.

For the metal catalyst of the anode side catalyst layer 5a, platinum (Pt)- ruthenium (Ru) alloy micro-particles may be used preferably, for example, and for the metal of the cathode side catalyst layer 5c, Pt micro-particles are preferably used.

The anode side diffusion layer 6a is formed of a conductive porous material which diffuses fuel, discharges carbon dioxide generated by electricity production, and has electron conductivity. For the conductive porous material, a carbon paper and a carbon cloth may be mentioned, for example.

The cathode side diffusion layer 6c is formed of a conductive porous material which diffuses air, discharges water generated by electricity production, and has electron conductivity. For the conductive porous material, a carbon paper and a carbon cloth may be mentioned, for example.

The anode side separator 3a and the cathode side separator 3c, which are in plate form and are disposed on the outside of the membrane electrode assembly 2 to mechanically fix the membrane electrode assembly 2, are explained next.

On the portion of the anode side separator 3a contacting the membrane electrode assembly 2, an anode side flow path 12a is formed to supply a fuel to the anode 7a, and to discharge the electrode reaction product and the unreacted product from the direct methanol fuel cell 1. On the other hand, on the portion of the cathode side separator 3c contacting the membrane electrode assembly 2, a cathode side flow path 12c is formed to supply an air to the cathode 7c, and to discharge the electrode reaction product and the unreacted product from the direct methanol fuel cell 1.

Materials for the anode side separator 3a and the cathode side separator 3c are not limited particularly, as long as the material has hermeticity, electron conductivity, and electrochemical stability. For example, metal, carbon, a composite material of graphite and resin may be mentioned.

The structure of the cathode side flow path 12c in the cathode side separator 3c is not limited particularly, and various structures conventionally used for cathode side flow paths may be applied. The cathode side flow path 12c in FIG. 1 is formed of linear grooves, which are separated by ribs 13, extending to the direction perpendicular to the paper plane.

The direct methanol fuel cell 1 of the present invention is characterized by the structure of the anode side flow path 12a in the anode side separator 3a.

The anode side flow path 12a is formed of linear grooves, which are separated by ribs, extending to the direction parallel to the paper plane (not shown). Additionally, as shown in FIG. 1, the anode side flow path 12a in this embodiment is divided along the direction substantially perpendicular to the depth of the anode side flow path 12a (along the direction perpendicular to arrow X in FIG. 1), by a film 16 permeable to gas but hardly permeable to liquid, to form a first flow path portion 18 positioned at a side of the membrane electrode assembly 2, and a second flow path portion 19 positioned at the bottom side of the anode side flow path 12a. In the first flow path portion 18, the fuel mainly flows in the direction of the arrow Q, and in the second flow path portion 19, carbon dioxide mainly flows in the direction of the arrow R.

Figure 2:
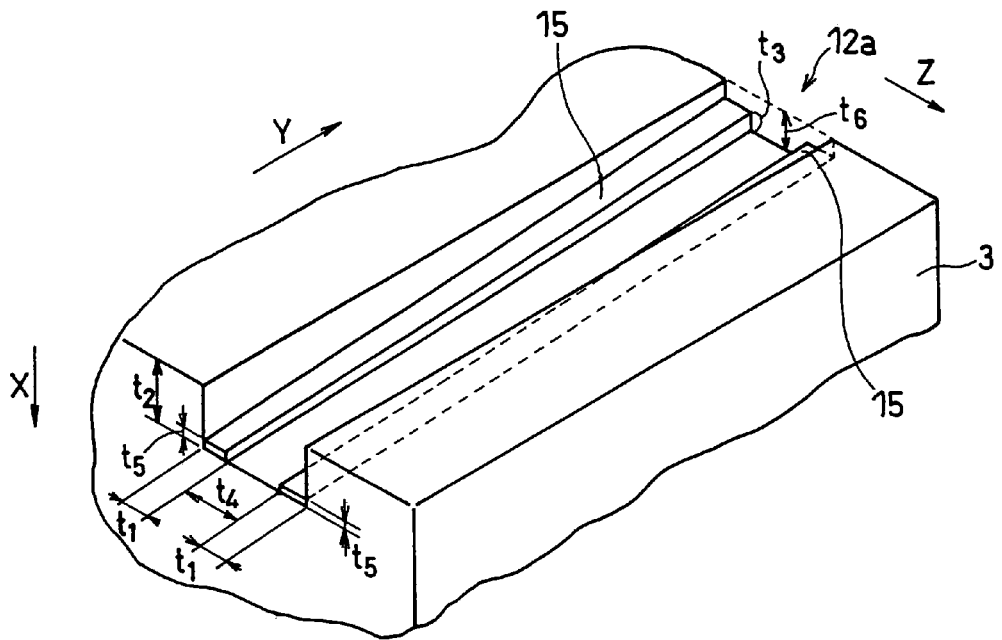
FIG. 2 is a schematic perspective view of the anode side separator 3a in FIG. 1 seen from the anode side flow path 12a side (the film 16 is taken out from the anode side flow path 12a).

FIG. 2 is a schematic perspective view of the anode side separator 3a in FIG. 1 seen from the anode side flow path 12a side (a film 16 is taken out from the anode side flow path 12a). The anode side flow path 12a in this embodiment is formed of linear grooves extending to the direction of the arrow Y shown in FIG. 2.

On both bottom corners in each groove as shown in FIG. 2, slopes 15 extending and increasing its height in the direction of the arrow Y are provided. By fixing the film 16 on the slopes 15, the anode side flow path 12a is divided in the direction perpendicular to the arrow X, thereby forming the first flow path portion 18 and the second flow path portion 19 as shown in FIG. 1.

The film 16 is formed of a water-repellent layer 16A and a gas permeable layer 16B comprising a porous body. The water-repellent layer 16A exhibits impermeableness, and the gas permeable layer 16B exhibits gas permeability.

For the porous body forming the gas permeable layer 16B, for example, a porous silica glass obtained by heating carbon paper and borosilicate soda-lime glass to split phase and then processing the same with acid, and a water-repellent resin porous body such as zeolite and a polytetrafluoroethylene (PTFE) resin may be used.

The water-repellent layer 16B is mainly composed of a water-repellent resin, and may be formed by using a water-repellent ink in paste form including, as main components, water-repellent resin micro-particles such as polytetrafluoroethylene (PTFE) resin micro-particles or polytetrafluoroethylene-polyhexafluoropropylene copolymer (FEP) resin micro-particles, and a water-repellent binder such as a fluorocarbon resin or a silicone resin, for example. A spray coating method may be suitably used, for example.

The surface of the water-repellent layer 16A is uneven. The unevenness can be adjusted, by appropriately controlling the composition of the solid content concentration in the water-repellent ink, and conditions on application such as a drying temperature and a drying period.

Figure 3:
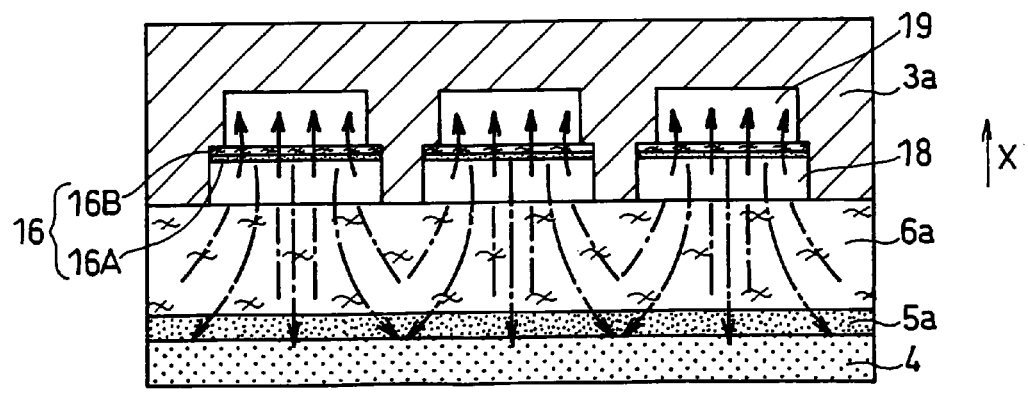
FIG. 3 is a partial cross sectional view of the direct methanol fuel cell 1 shown in FIG. 1 at the line P-P (a cross sectional view of the membrane electrode assembly 2 and the anode side separator 3a portion) while the direct methanol fuel cell 1 in this embodiment is in operation.

FIG. 3 is a partial cross sectional view of the direct methanol fuel cell 1 shown in FIG. 1 at the line P-P while the direct methanol fuel cell 1 in this embodiment is in operation. The anode side flow path 12a has a film 16 permeable to gas but hardly permeable to liquid such that the water-repellent layer 16A is located on the membrane electrode assembly 2 side, and the gas permeable layer 16B is located at the bottom side of the anode side flow path 12a, as shown in FIG. 3.

By locating the water-repellent layer 16A on the membrane electrode assembly 2 side and the gas permeable layer 16B on the anode side flow path 12a side, as noted in the above, fuel mainly flows in the first flow path portion 18, and carbon dioxide mainly flows in the second flow path portion 19.

Although a representative embodiment of the present invention is described in the above, various design changes are possible for the direct methanol fuel cell of the present invention, as long as the change is not detrimental to the effects of the present invention.

For example, although in the above embodiment, all the lines of the grooves (a plurality of grooves) forming the anode side flow path extending in parallel are divided by the film permeable to gas but hardly permeable to liquid to form the first flow path portion and the second flow path portion, a single line to several lines of the grooves among the plurality of grooves forming the anode side flow path may be divided to form the flow path portions.

Also, although in the embodiment, a line of the groove is divided to the flow path portions from one end (starting point) of the groove to the other end of the groove (ending point), at least a portion of one groove may be divided to the flow path portions, as long as the effects of the present invention can be obtained.

To supply a fuel and an air to the anode side flow path $12a$ and to the cathode side flow path $12c$, respectively, manifolds to supply the fuel and the air are necessary. For the manifolds, any of the conventional internal manifold and external manifold may be used.

In the following, the present invention is described further in detail by referring to Examples and Comparative Examples. However, the present invention is not limited to these Examples.

EXAMPLE

Example 1

A direct methanol fuel cell 1 of the present invention having a structure shown in FIG. 1 is made in this Example.

Anode side catalyst particles (Pt: 30 wt %, Ru: 30 wt %) were obtained by allowing Ketjen black EC (manufactured by AKZO Chemie), i.e., conductive carbon particles with a mean primary particle size of 30 nm, to carry 30 wt % of Pt and 30 wt % of Ru respectively having an average particle size 30 angstrom. Cathode side catalyst particles (Pt: 50 wt %) were obtained by allowing Ketjen black EC to carry 50 wt % of Pt with an average particle size of 30 angstrom.

Then, a paste for the anode side catalyst layer was prepared by mixing an isopropanol dispersion of the anode side catalyst particles and an ethanol dispersion of a polymer electrolyte and then by highly dispersing the obtained mixture by a beads mill. A paste for the cathode side catalyst layer was prepared by mixing an isopropanol dispersion of the cathode side catalyst particles and an ethanol dispersion of a polymer electrolyte and then by highly dispersing the obtained mixture by a beads mill.

In the paste for the anode side catalyst layer and the paste for the cathode side catalyst layer, the weight ratio of the conductive carbon particles and the polymer electrolyte was set to 2:1. For the polymer electrolyte, perfluorocarbon sulfonic acid ionomer (Flemion manufactured by Asahi Glass Co., Ltd.) was used.

The prepared paste for anode side catalyst layer and paste for the cathode side catalyst layer were applied on resin sheets respectively by using a Doctor Blade, and dried for 6 hours at ordinary temperatures in the air. Then, the resin sheets with the above pastes applied were cut to give a size of 6 cm×6 cm, thereby obtaining a sheet with the anode side catalyst layer (anode side catalyst sheet) and a sheet with the cathode side catalyst layer (cathode side catalyst sheet).

A polymer electrolyte membrane 4 was sandwiched by the obtained anode side catalyst sheet and the cathode side catalyst sheet so that the catalyst layers face the polymer electrolyte membrane 4, and the anode side catalyst layer and the cathode side catalyst layer were attached to the polymer electrolyte membrane 4 by thermal transfer by hot pressing (135° C., 3 MPa, and 15 minutes). For the polymer electrolyte membrane 4, perfluoroalkyl sulfonic acid ion exchange film (Nafion® 117 manufactured by E.I. du Pont de Nemours and Company) was used.

Then, an assembly of the anode side catalyst layer 5a, the polymer electrolyte membrane 4, and the cathode side catalyst layer 5b was obtained by removing the resin sheet. The amount of the platinum (Pt) catalyst in the anode side catalyst layer 5a and the cathode side catalyst layer 5b was respectively 2.0 mg/cm$^2$.

Subsequently, on the outer side of the anode side catalyst layer 5a and the cathode side catalyst layer 5b in the assembly, an anode side diffusion layer 6a and a cathode side diffusion layer 6c were placed respectively, and then attached by hot pressing (135° C., 3 MPa, 15 minutes). For the anode side diffusion layer 6a and the cathode side diffusion layer 6c, a carbon paper (TGP-H120 manufactured by Toray Industries, Inc.) cut to give a size of 6 cm×6 cm was used.

Further, gas sealing materials 11 were attached to the polymer electrolyte membrane 4 at the surroundings of the anode 7a and the cathode 7c so as to sandwich the membrane 4 by thermal welding (135° C., 4 MPa, and 30 minutes), thereby producing a membrane electrode assembly (MEA) 2.

The anode side separator 3a (a size of 10 cm×10 cm, and a thickness of 4 mm) having the structure as shown in FIG. 2 was made by cutting a resin-impregnated graphite material.

To be specific, grooves each with a width of $(2 \times t_1 + t_4)$ 4 mm, a starting-point depth $(t_2)$ of 1 mm, and an ending-point depth $(t_6)$ of 0.6 mm were formed. Also, inside of the groove, two slopes 15 each satisfying the dimensions of a width $(t_1)$ of 1 mm (i.e., $t_4=2$ mm), a starting-point depth $(t_2)$ of 1 mm (i.e., a starting-point height $t_5=0$ mm of the slope 15), and an ending-point height $(t_3)$ of 0.3 mm were provided.

Then, a film 16 with water-repellency and gas permeability was made to be disposed on the slope 15 of the anode side flow path 12a.

The film 16 was obtained by spray coating a super-repellent material mainly composed of resin micro-particles of polytetrafluoroethylene (PTFE) and a silicone resin (HIREC 1450 manufactured by NTT Advanced Technology Corporation) on the surface of a gas permeable layer 16B obtained by cutting a carbon paper (TGP-H120 manufactured by Toray Industries, Inc.) to give a width of 2 mm, and then drying for 20 minutes at a temperature of 70° C. to form a water-repellent layer 16A (a thickness of about 40 μm).

A carbon adhesive (ST-201 manufactured by Nisshinbo Industries, Inc.) was applied on a plane of the slopes 15, and the film 16 obtained in the above was placed on the slopes 15 so that the gas permeable layer 16B was positioned at the bottom side of anode side flow path 12a, and the water-repellent layer 16A was positioned at the side of membrane electrode assembly 2 for adhesion.

Then, anode side flow paths 12a of the anode side separator 3a were formed, as shown in FIG. 4. FIG. 4 is a front view of the anode side separator 3a in this Example seen from the anode side flow path 12a side.

As shown in FIG. 4, the anode side separator 3a in this Example is substantially rectangular, and the anode side flow path 12a is formed of seven lines of the linear grooves 12a$_1$ communicating with an inlet 3a$_1$ and an outlet 3a$_2$. In this Example, the film 16 was disposed on all of the seven lines of the linear groove $12a_1$. The portion illustrated with the dotted line in FIG. 4 is the portion in correspondence with the anode 7a (electrode portion)(ref. FIG. 1).

For the cathode side separator 3c, a separator having the same structure with the one shown in FIG. 4 was used except that the slope 15 and the film 16 were not provided, and the depth and the width of the grooves forming the flow path were set to constant.

However, upon assembling the direct methanol fuel cell 1, the anode side separator 3a and the cathode side separator 3 were disposed so that the seven lines of the linear groove $12a_1$ of the anode side flow path 12a, and the linear groove (not shown) of the cathode side flow path 12c crossed at right angles.

Finally, the membrane electrode assembly 2 obtained in the above was sandwiched by the anode side separator 3a and the cathode side separator 3b to obtain a stack, and on both sides of the obtained stack, a current collecting plate, a heater, an insulating plate, and an end plate were disposed respectively, and then the whole was fixed by clamping rods (not shown). The clamping pressure at this time was set to 20 kgf/cm² of the anode side separator 3a and the cathode side separator 3b.

A direct methanol fuel cell (cell 1) of the present invention was thus produced as described in the above.

Comparative Example 1

A fuel cell (cell 2) was made in the same manner as Example 1, except that the film 16 was not provided in the anode side flow path 12a of the anode side separator 3a.

Comparative Example 2

As an anode side diffusion layer 6a, a carbon paper (TGP-H120 manufactured by Toray Industries, Inc.) was cut to give a size of 6 cm×6 cm, and impregnated with 10 wt % of polytetrafluoroethylene-polyhexafluoropropylene copolymer (FEP), i.e., a thermosetting resin. Subsequently, a mixture in slurry state was prepared by mixing a water-absorbent polymer gel with fuel permeability (Junlon PW-150 manufactured by Nihon Junyaku Co., Ltd.) and a water dispersion of Nafion (trade name) (manufactured by E.I. du Pont de Nemours and Company), and polyethylene oxide as a binder.

Then, a carbon paper impregnated with FEP was prepared, and a mask was disposed on one side of the carbon paper, so that the mask covers the portion not in correspondence with the anode side flow path 12a when the carbon paper was incorporated as the anode side diffusion layer 6a in the direct methanol fuel cell 1. On both sides of the carbon paper with the mask disposed, the mixture in the slurry state was applied while pressing the slurry into the paper, and then dried. The mask was removed thereafter, thus obtaining the anode side diffusion layer 6a in which a fuel permeable layer was formed where fuel permeable material was applied.

Figure 5:
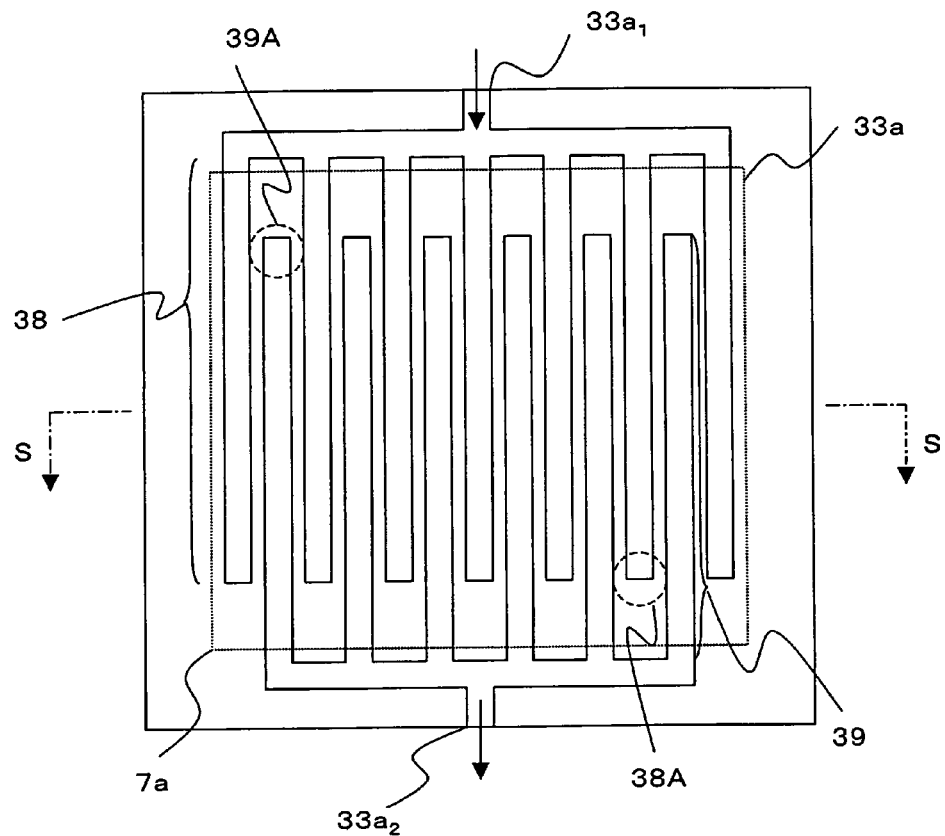
FIG. 5 is a front view of the anode side separator 33a used in Comparative Example 2 seen from the anode side flow path side.

In this Comparative Example, an anode side separator 33a having the structure shown in FIG. 5 was used. FIG. 5 is a front view of the anode side separator 33a used in this Comparative Example seen from the anode side flow path side.

In this anode side separator 33a, a fuel supply flow path 38 for supplying a fuel gas to the anode 7a, and a gas discharge flow path 39 for discharging carbon dioxide were alternately placed in parallel.

The opening area of the fuel supply flow path 38 was set to the same as the opening area of the anode side flow path 12a used in Example 1. Also, the gas discharge flow paths 39 were provided in between the fuel supply flow paths 38, and end portions 38A of the fuel supply flow paths 38 and starting portions 39A of the gas discharge flow paths 39 were closed within the area in correspondence with the anode 7a (electrode portion) shown in the dotted line.

A fuel cell was made in the same manner as Example 1 (cell 3) except that the anode side diffusion layer 6a and the anode side separator 33a thus made were used without using the film 16.

Comparative Example 3

A fuel cell was made in the same manner as Example 1 (cell 4) except that the water-repellent layer 16A was not provided in the film 16.

Example 2

A fuel cell was made in the same manner as Example 1 (cell 5) except that in the anode side flow path 12a of the anode side separator 3a, a starting-point height $t_5$ of the slopes 15 was set to 0.3 mm.

Example 3

A fuel cell was made in the same manner as Example 1 (cell 6) except that in the anode side flow path 12a of the anode side separator 3a, grooves with a starting-point depth ($t_2$) of 0.6 mm, and an ending-point depth ($t_6$) of 1 mm were formed, and a starting-point height $t_5$ of the slopes 15 was set to 0.3 mm, and an ending-point height ($t_3$) of the slopes was set to 0.7 mm.

Example 4

A fuel cell was made in the same manner as Example 1 (cell 7) except that in the anode side flow path 12a of the anode side separator 3a, grooves with a starting-point depth ($t_2$) of 0.6 mm, and an ending-point depth ($t_6$) of 0.6 mm were formed, and a starting-point height $t_5$ of the slopes 15 was set to 0.3 mm, and an ending-point height ($t_3$) of the slopes 15 was set to 0.3 mm.

Example 5

A fuel cell was made in the same manner as Example 1 (cell 8) except that in the anode side flow path 12a of the anode side separator 3a, grooves with an ending-point depth ($t_6$) of 1 mm were formed, and a starting-point height $t_5$ of the slopes 15 was set to 0 mm, and an ending-point height ($t_3$) of the slopes 15 was set to 0.7 mm.

[Evaluation]

In the cells 1 to 8, a 4M aqueous methanol solution was supplied to the anode side flow path 12a with a flow rate of 0.5 cc/min, and an air was supplied to the cathode side flow path 12C with a flow rate of 0.5 L/min, and electricity was generated at a cell temperature of 60° C. and a current density of 150 mA/cm² for 10 minutes. The voltage was measured and the amount of methanol discharged from the anode 7a side was measured after the 10 minutes electricity generation.

The voltage of the cell 2 was set as 100, and the voltages of cells 1 and 3 to 6 were shown as indexes relative to the voltage of the cell 2. For the amount of methanol discharge as well, the methanol discharge amount of the cell 2 was set as 100, and the methanol discharge amounts of the cells 1 and 3 to 6 were shown as indexes relative to the methanol discharge amount of the cell 2. The units for these values shown in Table 1 are the same.

Table 1 also shows the changes in cross sectional area of the second flow path portion (carbon dioxide ($CO_2$) discharge flow path) 19 from an upstream side to a downstream side. The changes in cross sectional area of the first flow path portion (fuel supply flow path) 18 from an upstream side to a downstream side are also shown.

The changes in cross sectional area of the anode side flow path 12a (linear grooves 12a1 in FIG. 4) including the first flow path portion 18 and the second flow path portion 19 are shown as well.

Further, Table 2 shows depths of the grooves (starting point and ending point) forming the anode side flow path, and heights of the slopes provided in the grooves (starting point and ending point).

path was divided to the first flow path portion for the fuel supply and the second flow path portion for the carbon dioxide discharge).

Figure 6:
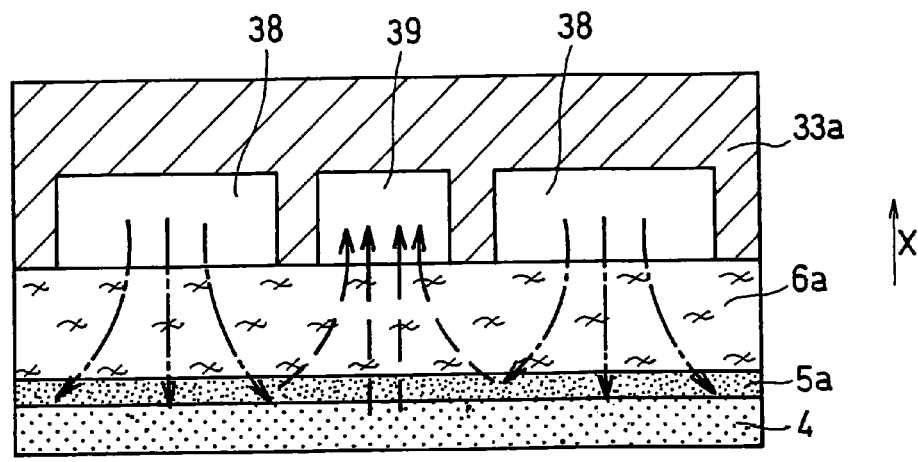
FIG. 6 is a schematic partial cross sectional view of the fuel cell in Comparative Example 2, obtained by cutting the fuel cell at the line S-S in FIG. 5 (a cross section of the membrane electrode assembly 2 and the anode side separator 33a portion).

In Comparative Example 2, as shown in FIG. 6, since a separate gas discharge flow path 39 was provided in the anode side separator 33a, the amount of fuel supply probably became insufficient at the region in the surface of the anode side catalyst layer 6a in correspondence with the gas discharge flow path 39, thereby decreasing the voltage. FIG. 6 is a schematic partial cross sectional view of the fuel cell in Comparative Example 2, obtained by cutting the fuel cell at the line S-S in FIG. 5.

On the other hand, in Example 1, as shown in FIG. 3, the anode side flow path 12a was divided along the direction

TABLE 1

| | Form of anode side flow path and film | | | | | | |
|---|---|---|---|---|---|---|---|
| Example | Presence/absence of film | Presence/absence of water-repellent layer | Change in cross-sectional area of second flow path portion ($CO_2$) | Change in cross-sectional area of first flow path portion (fuel) | Change in cross sectional area of anode side flow path | voltage | methanol discharge amount |
| Ex. 1 | Present | present | increase | decrease | decrease | 105 | 29 |
| Ex. 2 | Present | present | constant | decrease | decrease | 104 | 35 |
| Ex. 3 | Present | present | increase | constant | increase | 104 | 40 |
| Ex. 4 | Present | present | constant | constant | constant | 95 | 47 |
| Ex. 5 | Present | present | increase | decrease | constant | 104 | 39 |
| Comp. Ex. 1 | Absent | — | — | — | — | 100 | 100 |
| Comp. Ex. 2 | Absent | — | — | — | — | 85 | 27 |
| Comp. Ex. 3 | present | absent | increase | decrease | decrease | 102 | 95 |

TABLE 2

| | Dimensions of Anode side flow path (mm) | | | |
|---|---|---|---|---|
| Example | Depth of groove at starting point $t_2$ | Depth of groove at ending point $t_6$ | Height of slope at starting point $t_5$ | Height of slope at ending point $t_3$ |
| Ex. 1 | 1 | 0.6 | 0 | 0.3 |
| Ex. 2 | 1 | 0.6 | 0.3 | 0.3 |
| Ex. 3 | 0.6 | 1 | 0.3 | 0.7 |
| Ex. 4 | 0.6 | 0.6 | 0.3 | 0.3 |
| Ex. 5 | 1 | 1 | 0 | 0.7 |
| Comp. Ex. 1 | 1 | 0.6 | 0 | 0.3 |
| Comp. Ex. 2 | — | — | — | — |
| Comp. Ex. 3 | 1 | 0.6 | 0 | 0.3 |

As shown in Table 1, in Example 1, the discharge amount of methanol from the anode side decreased to the third of the amount in Comparative Example 1 (without film usage). This is probably because the carbon dioxide gas generated by electricity generation passed through the film and the carbon dioxide gas did not stay in the anode side flow path and in the anode side diffusion layer, thereby the fuel and the carbon dioxide gas were prevented from easily mixed together.

With regard to the voltage, the cell in Example 1 showed an improvement of about 23% compared with the cell in Comparative Example 2 (i.e., the cell in which the anode side flow perpendicular to the depth of the anode side flow path 12a, to the first flow path portion 18 positioned at the membrane electrode assembly 2 side, and the second flow path portion 19 positioned at the bottom side of the anode side flow path 12a. Thus, the fuel was supplied to the anode side diffusion layer 6a from the whole opening portion of the first flow path portion 18, thereby supplying the fuel evenly to the whole surface of the anode side catalyst layer 5a.

As in Comparative Example 2, ratio of the opening areas for the fuel supply flow path 38 and the gas discharge flow path 39 can be changed to increase the opening area of the fuel supply flow path 38, for avoiding insufficient supply of the fuel to the region in corresponding with the gas discharge flow path 39 to a certain degree. However, as long as the separate gas discharge flow path 39 is provided, the same fuel supply status as in Example 1 cannot be formed.

In Comparative Example 3, although only the gas permeable layer 16B in Example 1 was used and the water-repellent layer 16A was not provided, the methanol discharge amount in Comparative Example 3 was not so much different from that of Comparative Example 1. This is probably because the absence of the water-repellent layer 16A caused the gas permeable layer 16B to pass not only the carbon dioxide gas but also the fuel.

In Example 2, the size of the second flow path portion 19 in which the carbon dioxide gas flows in Example 1 was set to constant from an upstream side to a downstream side of the fuel flow, and the methanol discharge amount was increased more than that of Example 1. This is probably because the large volume of the gas layer in the upstream side of the fuel flow caused the liquid fuel to partially vaporize, to pass through the gas permeable layer, and finally to be discharged without being used.

In Example 5, the size of anode side flow path of Example 1 was made constant from an upstream side to a downstream side of the fuel flow, and the methanol discharge amount slightly increased compared with Example 1. This is probably because the large gas layer in the downstream side of the fuel flow caused the liquid fuel to partially vaporize, to pass through the gas permeable layer, and finally to be discharged without being used.

The polymer electrolyte fuel cell of the present invention which directly uses methanol or an aqueous methanol solution as a fuel without reforming it into hydrogen is useful as a power source for mobile electronic devices such as mobile phones, personal data assistants (PDA), laptop computers, and camcorders. The polymer electrolyte fuel cell of the present invention may also be used as a power source for electrically-powered motorcycles.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A direct methanol fuel cell comprising:
   a membrane electrode assembly with a first side and a second side opposite to said first side, said assembly comprising a polymer electrolyte membrane with a first side and a second side opposite to said first side, an anode attached to said first side of said polymer electrolyte membrane, and a cathode attached to said second side of said polymer electrolyte membrane;
   an anode side separator disposed on said first side of said membrane electrode assembly; and
   a cathode side separator disposed on said second side of said membrane electrode assembly;
   wherein said anode side separator is provided with an anode side flow path comprising at least one groove formed on an anode side thereof, and said cathode side separator is provided with a cathode side flow path comprising at least one groove formed on a cathode side thereof,
   at least a portion of said anode side flow path is divided, along the direction perpendicular to the depth thereof by a film permeable to gas but hardly permeable to liquid, to have a first flow path portion positioned at a side of said membrane electrode assembly and a second flow path portion positioned at a bottom side of said anode side flow path,
   a slope to which said film is fixed is formed on each bottom corner of said groove of said at least a portion of said anode side flow path, the height of said slope increasing from an upstream side toward a downstream side, and
   a fuel mainly flows in said first flow path portion and carbon dioxide mainly flows in said second flow path portion.

2. The direct methanol fuel cell in accordance with claim 1, wherein said film includes a porous body.

3. The direct methanol fuel cell in accordance with claim 2, wherein said porous body is formed of at least one selected from the group consisting of carbon, ceramic, glass, and resin.

4. The direct methanol fuel cell in accordance with claim 1, wherein water-repellency is given to said film on the membrane electrode assembly side thereof.

5. The direct methanol fuel cell in accordance with claim 1, wherein said membrane electrode assembly side of said film has a porous surface.

6. The direct methanol fuel cell in accordance with claim 1, wherein said second flow path portion is formed so that a cross sectional area thereof substantially perpendicular to a longitudinal direction of said second flow path portion increases from an upstream side toward a downstream side, and said first flow path portion is formed so that a cross sectional area thereof substantially perpendicular to a longitudinal direction of said first flow path portion decreases from an upstream side toward a downstream side.

\* \* \* \* \*